United States Patent [19]

Janssen

[11] 4,129,343
[45] Dec. 12, 1978

[54] UNITARY SELF-ALIGNING BEARING ASSEMBLY

[75] Inventor: Pierre A. Janssen, Grisy Les Platres, France

[73] Assignee: Nadella, Rueil Malmaison, France

[21] Appl. No.: 841,392

[22] Filed: Oct. 12, 1977

[30] Foreign Application Priority Data

Oct. 22, 1976 [FR] France ................................. 76 31880

[51] Int. Cl.² .............................................. F16C 23/00
[52] U.S. Cl. ..................................... 308/35; 64/17 A;
  308/36.1; 308/72; 308/174; 308/194; 403/124
[58] Field of Search .................. 308/35, 72, 36.1–36.5,
  308/212–214, 216, 174, 207, 208, 209, 222, 226,
  15, 231, 234, 235, 175, 176, 194; 64/17 A;
  403/124–126, 90, 57; 29/148.4 B, 149.5 B

[56] References Cited

U.S. PATENT DOCUMENTS

| 1,205,539 | 11/1916 | Hirth | 308/174 |
| 2,197,499 | 4/1940 | Heinze | 308/174 |
| 3,845,999 | 11/1974 | Zimmer et al. | 308/194 |

Primary Examiner—Trygve M. Blix
Assistant Examiner—Douglas C. Butler
Attorney, Agent, or Firm—Littlepage, Quaintance, Murphy, Richardson and Webner

[57] ABSTRACT

A self-aligning bearing has an outer radial bearing ring formed with a convex outer surface mounted in a concave outer casing having a complementary surface to provide limited universal angular movement of the bearing. Axial thrust bearings are provided at opposite ends of the bearing between the ends of the outer radial bearing ring and radial flanges on the ends of the inner radial bearing ring, to allow movement of the outer bearing ring and prevent overloading of the bearing ends of the bearing members.

8 Claims, 1 Drawing Figure

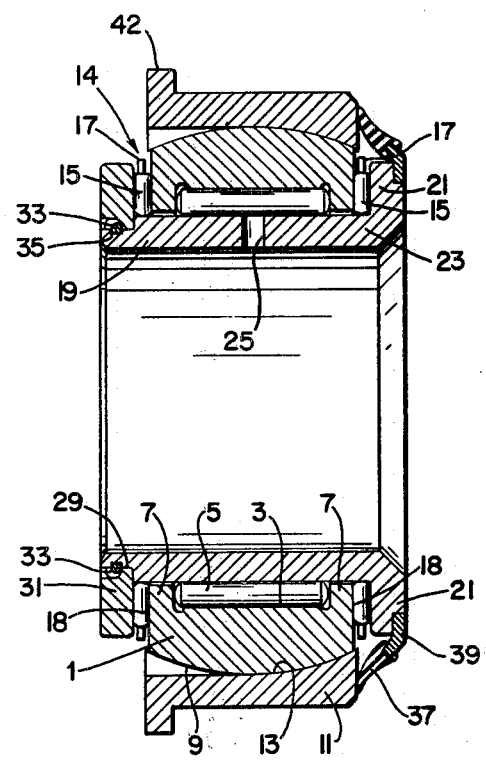

UNITARY SELF-ALIGNING BEARING ASSEMBLY

This invention relates to self-aligning bearings of the ball and socket type having an outer radial bearing ring with a convex exterior surface movably mounted within a casing having a complementary internal shape.

Bearings of this type are used whenever it is necessary to obtain automatic alignment at the time of assembly.

However, known bearings of this type are not capable of compensating, during operation, for shaft flexion or other effects, such as deformations, and need self-alignment of the bearing under load. In fact, the sliding friction of the bearing ring (the ball) in the casing (the socket) under load has a tendency to oppose any self-alignment made necessary by the aforementioned operating conditions with the result that the ends of the bearing members are overloaded and therefore subjected to accelerated wear shortening bearing life.

According to the present invention, in a self-aligning bearing of the ball and socket type, the outer radial bearing ring has at least one radial end face carrying a bearing race with an axial thrust bearing mounted thereon.

In a preferred embodiment of the invention, both radial end faces of the outer radial bearing ring carry a bearing race, each having an axial thrust bearing mounted thereon.

In case of stress during operation under load, the invention enables the friction of the ball in the socket to be overcome by preventing overloading of the bearing member ends to absorb the radial load through movement transmitted by at least one of the thrust bearings. While fulfilling this function, the thrust bearings also ensure that a bearing is constructed which is capable of transmitting axial loads.

In another embodiment of the invention, the inner radial bearing ring and the back plate of one of the thrust bearings are formed as a single piece. The back plate for the second thrust bearing may be fixed to the inner ring, such an arrangement forming a unitary bearing that is easy to handle and assemble.

The above and other features of the invention are illustrated by way of example in the single FIGURE of the accompanying drawing of an axial section of a self-aligning bearing of the ball and socket type in accordance with the invention.

As shown, the self-aligning bearing comprises an outer radial bearing ring 1 having, on its interior surface, a sunken race 3 for roller or needles 5 that are axially located between flanges 7. The exterior convex (preferably spherical) surface 9 of the ring is assembled so that it can move within a casing 11 having a complementary internal shape 13 (also preferably part-spherical). The outer bearing ring 1 also has a pair of radial end faces 18 forming the inner races for a pair of axial thrust bearings 14 each having cylindrical bearing members 15 held and guided by cages 17.

The inner radial bearing ring 19 and the back plate 21 of one of the two thrust bearings 14 are formed as a single piece 23. The piece 23 is also provided with axial greasing holes 25 and, at its free end remote from back plate 21, the piece is provided with a radial shoulder 29 against which the back plate 31 of the second thrust bearing is abutted. The back plate 31 is rendered fixed to piece 23 by a clip 33 in a peripheral groove about the free end of piece 23 and cooperating with a groove in the outer end of back plate 31. Both back plates could be assembled with the inner radial bearing ring in this manner.

The ball and socket type self-aligned bearing of this invention is therefore formed as a unitary assembly. The casing 11 is separable from the outer bearing ring 1 in known manner upon rotation to be perpendicular to the bearing axis.

A lip face seal 37 is mounted on an annular plate 39 anchored to the back plate 21 to bear against the end of casing 11 and seal the thrust bearing. A similar seal may be provided at the other end to seal the other thrust bearing.

The casing 11 includes at one end a radially outwardly extending flange 42 to enable the bearing to be located and immobilized in a support (not shown). The casing could have such flanges at both ends to locate and immobilize the bearing in a two part support.

In alternative and unillustrated embodiments of the invention, the radial bearing members 5 could be held and guided in a cage having one or more rows of needles or rollers.

Also, the thrust bearing cages 17 could be held against either the radial end faces 18 or the back plates by ferrules set on the outer radial bearing ring or the back plates in a known manner.

I claim:

1. A self-aligning bearing assembly comprising a casing having an internal concave spherical surface adjacent one end on one side of a central medial plane, an outer radial bearing ring mounted in said casing and having an outer convex spherical surface complementary to and fitting said internal concave surface on said casing, an inner radial bearing ring within said outer radial bearing ring, and roller type bearings between said rings, said outer radial bearing ring having radial end faces and said inner radial bearing ring having radial back plates fixed on its ends opposed to and axially spaced from said radial end faces on said outer radial bearing ring so that each end face of said outer radial bearing ring and the corresponding radial back plate on said inner radial bearing ring form bearing races, and thrust bearings between the bearing races, each of said thrust bearings having a bearing cage carried by a radial end face, and a seal fixed on one of the back plates of said inner bearing ring and extending to and engaging said one end of said casing to form a seal for the thrust bearing engaging said one of said back plates.

2. A self-aligning bearing assembly comprising a one-piece, integral casing having an internal concave, spherical surface, an integral, one-piece outer radial bearing ring mounted in said casing having a convex spherical exterior surface complementary to and fitting in said internal concave surface on said casing, and an axial thrust bearing at one end of said assembly, said outer radial bearing ring having an integral, radial end face forming a bearing race for said thrust bearing, an inner radial bearing ring within said outer radial bearing ring, radial bearing elements between said bearing rings, a radial face integral with said inner radial bearing ring, and axial bearing elements between said radial faces.

3. A unitary, self-aligning bearing assembly comprising a casing having an internal concave spherical surface, an outer radial bearing ring mounted in said casing and having an external convex spherical surface complementary to and fitting in said internal concave surface on said casing, an inner radial bearing ring within said outer radial bearing ring and radial bearing elements between said bearing rings, one of said bearing rings being a one-piece, integral member having radial end flanges confining said radial bearing elements, and the other of said bearing rings having fixed radial end flanges opposed to and spaced axially from the radial end flanges on said one of said bearing rings, an axial thrust bearing at one end of said assembly comprising an end radial face on the end flange of said outer radial bearing ring and a radial face on said inner radial bearing ring opposed to and axially spaced from said end radial face on said outer radial bearing ring, and axial thrust bearing elements between said radial faces.

4. An assembly as claimed in claim 3, and a second axial thrust bearing at the other end of said assembly, and a second radial end face on the other end flange of the outer radial bearing ring, said radial end flanges on said inner radial bearing ring froming radial back plates fixed on its opposite ends with radial surfaces opposite to and spaced from the radial end faces on said outer radial bearing ring, and thrust bearings at both ends between said radial end faces and said back plates.

5. An assembly as claimed in claim 4, in which each of said axial thrust bearings is mounted in a cage carried by a radial end face.

6. An assembly as claimed in claim 3, and a seal carried by said inner bearing ring and extending over said axial thrust bearing to engage said casing and provide a seal for said axial thrust bearing.

7. A self-aligning bearing assembly as claimed in claim 3, in which said casing is a one-piece, integral member having said spherical surface on one side of a median, radial plane, the diameter of the internal surface of said casing on the other side of said plane being at least as great as the diameter of said spherical surface, so that said outer bearing ring may be inserted in said spherical surface.

8. A unitary, self-aligning bearing assembly comprising a one-piece, integral outer bearing ring having a spherical, convex peripheral surface, a cylindrical inner radial bearing race, and radial end flanges, an inner bearing ring having a cylindrical outer radial bearing race and end flanges fixed on said inner bearing ring, and radial bearing elements between said radial bearing races, said outer bearing ring being positioned between the flanges of said inner bearing ring with the end flanges at each end of said bearing rings being axially spaced to provide axial bearing races, and axial bearing elements between the said axial bearing races at each end of said assembly.

* * * * *